United States Patent

[11] 3,607,164

| [72] | Inventors | Craig L. Thom;<br>Charles L. McKinnis, both of Granville, Ohio |
|---|---|---|
| [21] | Appl. No. | 850,792 |
| [22] | Filed | Aug. 18, 1969 |
| [45] | Patented | Sept. 21, 1971 |
| [73] | Assignee | Owens-Corning Fiberglass Corporation |

[54] APPARATUS FOR PRODUCING GLASS FILAMENTS
8 Claims, 7 Drawing Figs.

[52] U.S. Cl. .................................................. 65/1, 65/12
[51] Int. Cl. ................................................... C03b 37/00
[50] Field of Search ........................................ 65/1, 2, 11, 12

[56] References Cited
UNITED STATES PATENTS

| 3,068,669 | 12/1962 | Fiedler ........................... | 65/1 |
| 3,468,643 | 9/1969 | Stalego et al. ................. | 65/1 |

*Primary Examiner*—S. Leon Bashore
*Assistant Examiner*—Robert Lindsay, Jr.
*Attorneys*—Staelin & Overman and Charles F. Schroeder

ABSTRACT: An apparatus for producing glass filaments has an array of orificed tips through which streams of molten glass are flowed and then attenuated into filaments. A uniform filament-forming environment is attained by employment of solid heat-radiating tips to thermally shield certain active array boundary tips from the influences of a cooler ambient atmosphere.

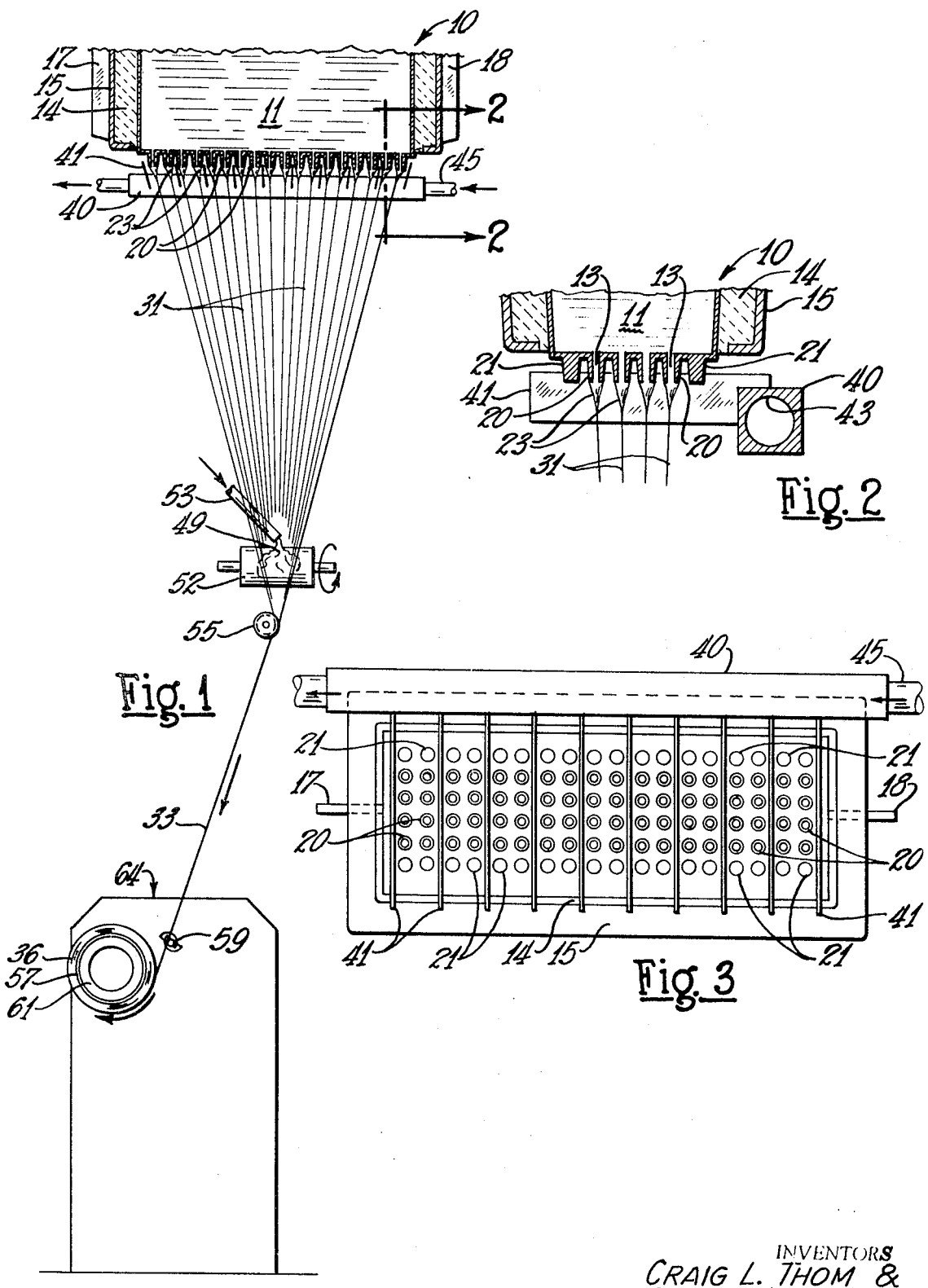

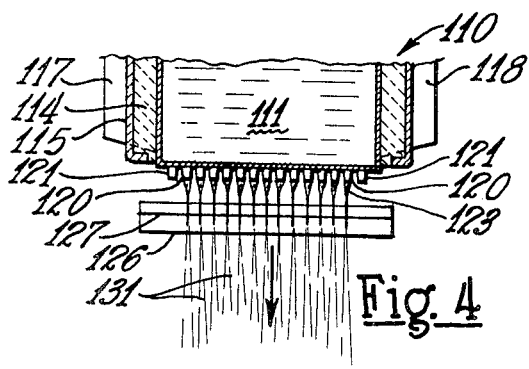
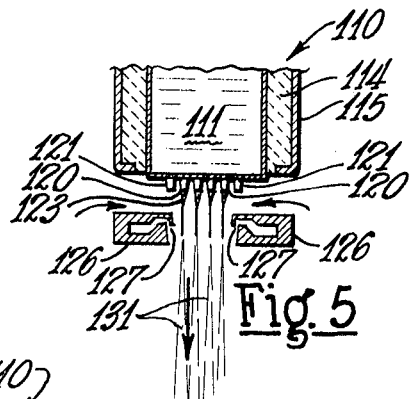
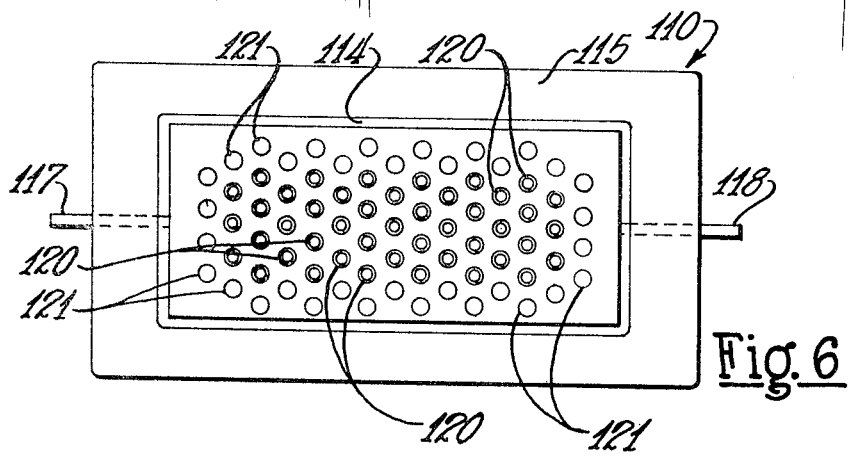
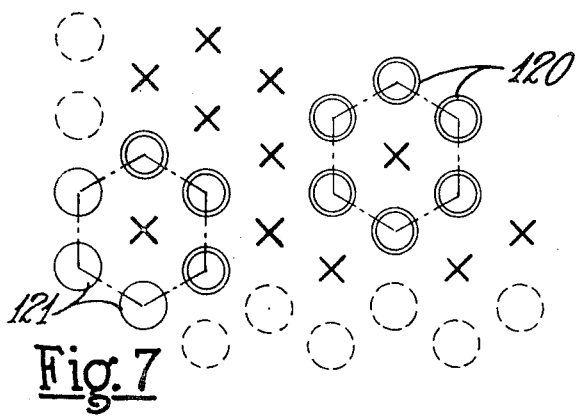

APPARATUS FOR PRODUCING GLASS FILAMENTS

As will be understood from the following written description, the present invention may be used to produce filamentary materials from various and different thermoplastic or heat-softenable materials. It is especially applicable to the manufacture of glass filaments, and as the best exemplification, this use of the invention is particularly described herein.

It is known in the art to produce glass filaments by flowing streams of molten glass from a plurality of orificed tips provided on the bottom side of a heated feeder. The streams are attenuated, usually by mechanical means, into small diameter filaments which are then gathered and processed into a variety of commercial products.

By reason of cohesive and surface tension forces, each stream of molten glass emanating from an orificed tip tends to taper into a conelike body from which a filament is attenuated and pulled from the region of its apex. Experience in the manufacture of glass filaments has indicated that the viscosity range of the glass wherein attenuation may be accomplished is somewhat limited. It has been found that if viscosity is too low, temperature too high, the glass has a tendency to form into beads or to flood erratically from the orifices in an upwardly direction; if the viscosity is too high, temperature too low, the filament diameters are so diminished that they become unacceptable or their continuity is broken. Since glass viscosity is closely related to temperature, the need for precise glass temperature control in the region of filament attenuation is apparent. It is further evident that in attempting to precisely control this temperature success depends largely on the ability to uniformly control the thermal environment surrounding the molten glass streams as they are exposed to the atmosphere.

In the past, feeder thermal environment in the filament-forming zone has been controlled reasonably well by using an associated gas cooling or heat transfer apparatus. The approach has served also to promote an acceptable degree of thermal stability in the glass cones with respect to each other but under certain conditions, such as in large feeders, filament quality has been somewhat difficult to maintain as a result of the nonuniform thermal experiences of a few remotely positioned tips. For example, in rows or groups of equispaced orificed tips, the outermost located tips of the overall pattern do not receive the same amounts of radiated heat as do the ones interiorly located. In essence, the inner tips are recipients of heat from all immediately surrounding active tips whereas the outer tips are generally exposed in part to a relatively cool ambient atmosphere. The existence of differentials in forming tip temperatures results in the production of filaments by nature having variant diameters and characteristics and this of course cannot be tolerated in the manufacture of fibrous glass products.

According to the present invention, it has been discovered that solid heat-radiating tips may be arranged in a boundary relationship with the cooler tips to compensate for a lack of thermal uniformity. Prior art has sought to achieve the same result by erecting baffles or wall elements between the grouping of active feeder tips and the ambient atmosphere. The prior art arrangement appears unsatisfactory in most instances because it is difficult to duplicate with the baffles that thermal environment otherwise established by active tips. Furthermore, the baffles have a tendency to impede the general transfer of heat from the feeder-forming zone which is normally a prerequisite in the formation of filaments.

The present invention is directed to the provision of a glass filament forming apparatus wherein all active forming tips are subjected the same amounts of radiant heat.

Another object of the invention is the provision of a glass filament forming apparatus which employs solid heat-radiating tips in a boundary relationship with the active tip array to insure that the thermal environment of all tips therein is uniformly maintained.

A further object is the provision of a glass filament forming apparatus wherein solid or dummy tips, having heat radiation capabilities comparable to that of active forming tips, are used to thermally shield the active peripheral tips of the array from the detrimental effects of a cooler surrounding atmosphere.

Other and more specific objects and advantages of the invention will become apparent from the following more detailed written description wherein reference is made to the accompanying drawings in which:

FIG. 1 is a fragmentary front elevation, in partial section, which shows an apparatus used in the production of continuous glass filaments.

FIG. 2 is an enlarged cross section taken substantially along line 2—2 of FIG. 1 showing specifically the glass feeder and the solid heat-radiating tips of the present invention.

FIG. 3 is an enlarged bottom view of the filament-forming apparatus shown in FIGS. 1 and 2.

FIG. 4 is a fragmentary front elevation, in partial section, of a discontinuous filament-forming apparatus which employs the solid heat-radiating tips of the present invention in conjunction with a modified feeder array of forming tips.

FIG. 5 is a side elevation, in partial section, of the filament-forming apparatus shown in FIG. 4.

FIG. 6 is an enlarged bottom view of the filament-forming apparatus shown in FIGS. 4 and 5.

FIG. 7 is an enlarged corner segment of the filament-forming tip array of FIG. 6 which shows the equispaced duplicating tip pattern of this embodiment. To emphasize repetitive features of the combined solid and active tips of this particular array, a number of the active tips are designated by X's and a number of the solid tips are shown in broken lines.

Referring now more specifically to the drawings, there is shown in FIG. 1 a bushing or feeder 10 having adjacent rows of heat-radiating passageways, hollow projections or orificed tips 20 through which streams of molten glass 13 are caused to flow. The molten glass is then attenuated into continuous fibers or filaments 31 to which a binder or sizing 49 is applied by a roll 52. The binder or sizing 49 is supplied to applicator roll 52 in metered fashion by a conduit 53.

After formation, filaments 31 are gathered by a gathering surface or shoe 55 into a composite or strand 33 which is ultimately wound into a package 36 by a rotating tube 57. A traversing mechanism 59 is rotated against the strand 33 to distribute it reciprocally and longitudinally across the outer surface of the tube 57 as it rotates.

The tube 57 is removably mounted on a drum or collet 61 which is fixedly secured to a shaft (not shown) supported by a winder housing 64. The winder-supported shaft and thus collet 61 and tube 57 are rotated by a motor and interconnecting drive mechanism (not shown) at a relatively high angular velocity such that a suitable filament attenuation force is generated. Normally, the filament attenuation occurs while pulling the strand at a linear speed within the range of 12,000 to 15,000 feet per minute.

Heat-softenable material 11, glass in this instance, is supplied to the feeder 10 in molten form or in the form of batch, marbles and/or cullet. Heating of the material is accomplished resistively in the conventional manner by supplying a controlled voltage across feeder terminals 17 and 18. The feeder 10 is fabricated from a metallic material, e.g. platinum, rhodium alloys, etc., capable of withstanding the high temperature and abrasiveness of molten materials such as molten glass. The exterior sides of the feeder 10 are surrounded by a high temperature or insulating refractory 14 supported by an exterior frame 15.

Since molten glass is maintained in feeder 10 at a rather high temperature to enhance uniform flow through the tips 20, a subsequent reduction in temperature must be effected to bring the glass viscosity within a suitable attenuation range. A portion of the necessary heat loss is derived from the atmospheric dissipation of that heat which is conducted through the walls of tips 20. This is facilitated by small amounts of air naturally flowing adjacent to the feeder face. To further stabilize the emerging glass viscosity and remove the severe concentrations of heat surrounding the tips, an exterior cooling element may be used.

As seen more particularly in FIGS. 2 and 3, the additional environmental control may be provided by a manifold or hollow member 40 which extends longitudinally adjacent one edge of the bottom face of feeder 10 and has a plurality of spaced flat bars of fin shield members 41 affixed thereto in a heat transfer relationship. Fins 41 are fabricated from a metal such as copper, platinum, stainless steel and the like having comparatively high heat-conducting characteristics and are disposed in a parallel relationship transversely between rows of tips 20 such that a pair of rows or tips is located between adjacent fins. In this fashion, the orificed tip array is divided into equal groups of tips with each tip 20 and associated glass cone 23 having a fin 41 sufficiently close to shield them and provide a controlled environment. The passage 43 in member 40 accommodates a heat-absorbing or cooling fluid, such as water, which is continuously circulated by a conduit 45 in order to convey away desired amounts of heat transferred to the fins 41.

Since heat radiation form each tip 20 influences attenuation viscosity of the glass flowing from all neighboring tips, it is still difficult even with the aid of shielding fins to produce congruous filaments. The condition is such that by virtue of being partially subjected to a cooler atmospheric region, the active terminal tips of each row do not experience the same thermal surroundings as other active tips. Hence, terminal tip glass viscosity is maintained above norm and the filaments produced thereby are coarser in nature than the ones produced by the inner or thermally protected tips.

To correct or compensate this nonuniform condition existing generally about the periphery of the forming tip array, solid, dummy or nonorificed tips 21 are disposed as the boundary or terminal tips of each row. Tips 21 have exterior surfaces or dimensions substantially identical to that of orificed tips 20 and by being affixed directly to the forming face of feeder 10 they are capable of radiating a measure of heat comparable to that radiated by the orificed tips. The heat-shielding effect produced by the solid tips 21 when disposed as a part of the overall tip array creates an atmosphere wherein the former active terminal tips 20 behave characteristically as any other active forming tip. The stabilization of overall thermal environment thus enables the production of harmonious filaments.

FIGS. 4–6 illustrate another feeder 110 which has a plurality of inter heat-radiating orificed tips 120 on the bottom wall thereof through which streams of molten glass are emitted to the atmosphere and are attenuated into discontinuous filaments or fibers 131. The feeder 110 is resistance heated by a controlled voltage supplied across terminals 117 and 118 and has its sides encased by a refractory material 114 supported by a frame 115. Attenuation, binder application and filament-gathering may be mechanically accomplished in a manner which is customary in the art.

As best seen in FIG. 6, the orificed tips 120 are disposed across the forming face of feeder 110 in a substantially duplicating hexagonal pattern, that is, each tip has a surrounding six-fold coordination such that the overall array appears as a repeating or continuous pattern of hexagons. Use of this tip layout or configuration is desirable because it insures that a maximum number of equispaced tips are always present within any given area.

The operation of a feeder 110 having a large number of orificed tips compacted into a relatively small area may, however, produce an extreme thermal environment which tends to adversely affect stability within the forming cone region. Due to physical limitations, fin apparatus as heretofore described are not readily adaptable for use in conjunction with a concentrated tip pattern. As an alternative, an attenuation lower apparatus 126 can be used to introduce into the region surrounding the tips 120 a coolant or heat-dissipating substance which effects removal of heat from these tips and their respective glass-forming cones 123. The blower 126, as illustrated, has a hollow chamber which is supplied with a gas at a relatively high pressure. The gaseous substance is emitted to the atmosphere through blower orifices 127 in a downwardly direction to pull and attenuate the molten glass into fibrous form. The attenuation blast creates a reduced pressure area slightly above the apparatus 126 and consequently induces a gentle flow of cooler ambient atmosphere to move toward the region of fiberization. By naturally flowing over the top surfaces of the blowers 126, the induced atmosphere may be deflected to flow proximate to the feeder-forming face for removal of desired amounts of heat therefrom.

General environment of feeder 110 may be maintained satisfactorily by apparatus such as blowers 126, but this type of arrangement normally fails to provide a similar environment for all tips of the pattern. There remains the fact that the cooler atmosphere surrounding feeder 110 has a tendency to create a regional nonequivalent forming climate by thermally effecting the peripheral or remotely located tips of the overall array. A resultant production problem of fiber discontinuity, in the sense that overall output comprises fibers having different diameters and characteristics, is very similar to that heretofore discussed in regard to the production of continuous glass filaments.

Consequently, to facilitate production of uniform filaments, solid or nonorificed tips 121 are located on the face of feeder 110 in a heat-shielding relationship peripherally about the grouping of orificed tips 120. As indicated in the segmented tip array shown in FIG. 7, the nonorificed tips are spaced as a continuation of the hexagonal pattern in which the orificed tips are disposed. Tips 121 are fabricated substantially identical in size to the orificed tips 120 and therefore are capable of radiating comparable amounts of heat. Thus, the otherwise cooler boundary or peripheral tips 120 are provided with a six-fold coordination of heat-radiating tips which substantially duplicate the thermal environment ordinarily sensed by the inner active tips. By using this technique, the outer peripheral tips are thermally made to perform correspondingly as any other active tip.

The present invention may readily be employed with other fiber or filament-forming apparatus including those utilizing various and different feeder designs, tip arrays and the like. Thus, while we have herein shown and described particular embodiments of our invention, it will be understood that we are not limited thereto and that modifications may be made without departing from the true scope and spirit of the invention.

We claim:
1. An apparatus for producing glass filaments, comprising:
a feeder for feeding glass material in molten form;
a plurality of inter heat-radiating orificed tips in a wall of said feeder through which streams of the molten glass material are emitted;
a plurality of heat-radiating nonorificed tips extending from the wall of said feeder, said nonorificed tips being substantially equivalent in physical size to said orificed tips, said nonorificed tips being disposed as a part of the overall tip array to thermally compensate certain cooler orificed tips so that forming environment for all orificed tips is substantially equivalent; and
means located adjacent to said feeder for attenuating said streams of molten glass material into filaments.

2. An apparatus for producing glass filaments as recited in claim 1 wherein said nonorificed tips are disposed in a discontinuous boundary relationship with the orificed tip array.

3. An apparatus for producing glass filaments as recited in claim 1 wherein said orificed tips are disposed in adjacent rows with said nonorificed tips being disposed as terminal tips at the ends of each row.

4. An apparatus for producing glass filaments as recited in claim 1 wherein said orificed tips are disposed in a substantially duplicating hexagonal configuration to insure that a maximum number of equispaced tips are always provided within a given space.

5. An apparatus for producing glass filaments as recited in claim 4 wherein said nonorificed tips are disposed in a discontinuous manner peripherally about the group of said orificed tips.

6. An apparatus for producing glass filaments as recited in claim 5 wherein said nonorificed tips are disposed as a continuation of the hexagonal pattern in which said orificed tips are disposed.

7. An apparatus for producing glass fibers comprising:
   a feeder for feeding glass material in molten form;
   rows of heat-radiating orificed tips in a wall of said feeder through which streams of the molten glass material are emitted;
   a plurality of elongated shield members extending transversely between rows of said orificed tips; and
   a plurality of heat-radiating nonorificed tips extending from the wall of said feeder, said nonorificed tips being substantially equivalent in physical size to said orificed tips said nonorificed tips being disposed at opposite ends of each row of said orificed tips to promote a uniform filament-forming environment for all said orificed tips.

8. An apparatus for producing glass fibers as recited in claim 7 wherein said apparatus has means for forcefully cooling said shield members.